US012386711B2

(12) United States Patent
Thompson et al.

(10) Patent No.: US 12,386,711 B2
(45) Date of Patent: Aug. 12, 2025

(54) PRESERVING CHANGES WHEN REVERTING BACK TO A SNAPSHOT

(71) Applicant: International Business Machines Corporation, Armonk, NY (US)

(72) Inventors: Benjamin Graham Thompson, Eastleigh (GB); Mark James Lawrence, Eastleigh (GB); Erhan Mengusoglu, Southampton (GB); Stephen James Haskey, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/410,128

(22) Filed: Jan. 11, 2024

(65) Prior Publication Data

US 2025/0231841 A1 Jul. 17, 2025

(51) Int. Cl.
*G06F 11/14* (2006.01)

(52) U.S. Cl.
CPC .... *G06F 11/1469* (2013.01); *G06F 2201/815* (2013.01)

(58) Field of Classification Search
CPC ............. G06F 11/1469; G06F 2201/815
See application file for complete search history.

(56) References Cited

U.S. PATENT DOCUMENTS

| 7,472,420 | B1 * | 12/2008 | Pavlyushchik | G06F 21/56 |
| | | | | 713/188 |
| 8,301,686 | B1 * | 10/2012 | Appajodu | G06F 9/5077 |
| | | | | 718/1 |
| 8,321,377 | B2 * | 11/2012 | Michael | G06F 16/128 |
| | | | | 707/831 |
| 8,448,165 | B1 * | 5/2013 | Conover | G06F 9/45558 |
| | | | | 717/174 |

(Continued)

FOREIGN PATENT DOCUMENTS

| CA | 2347647 A1 | 11/2002 |
| CN | 111913779 A | 11/2020 |

OTHER PUBLICATIONS

King et al., "Debugging Operating Systems with Time-traveling Virtual Machines", 2005 USENIX Annual Technical Conference (Year: 2005).*

(Continued)

*Primary Examiner* — Charles Rones
*Assistant Examiner* — Huen Wong
(74) *Attorney, Agent, or Firm* — Scott Dobson

(57) ABSTRACT

Disclosed is a method, system, and computer program product for preserving actions taken after a snapshot. One embodiment of the method may comprise capturing a snapshot of a virtualized container environment (VCE), the VCE comprising one or more applications-of-interest. The method may further comprise intercepting an event-of-interest directed to an application-of-interest within the VCE. The method may further comprise automatically stor- (Continued)

ing the intercepted event in an action database. The method may further comprise, in response to a user instruction to revert the VCE to a prior snapshot, generating an automated script from the intercepted events, wherein the automated script comprises actions that occurred in the VCE after capture of the selected snapshot; and executing the automated script.

14 Claims, 11 Drawing Sheets

(56) References Cited

U.S. PATENT DOCUMENTS

| | | | |
|---|---|---|---|
| 8,458,688 B2 | 6/2013 | Ashok | |
| 8,955,108 B2* | 2/2015 | Neystadt | G06F 21/53 726/25 |
| 9,003,131 B1* | 4/2015 | Lunev | G06F 3/0656 711/147 |
| 9,264,923 B1* | 2/2016 | Sevindik | H04L 41/145 |
| 9,286,182 B2 | 3/2016 | Fries | |
| 9,524,389 B1* | 12/2016 | Roth | G06F 9/45558 |
| 9,558,085 B2* | 1/2017 | Lakshman | G06F 11/2094 |
| 9,588,793 B2* | 3/2017 | Warszawski | G06F 9/45558 |
| 9,778,990 B2* | 10/2017 | Forgette | G06F 11/1484 |
| 9,817,685 B2* | 11/2017 | Arcese | G06F 11/142 |
| 9,823,940 B2* | 11/2017 | Arcese | G06F 9/45558 |
| 10,114,564 B2* | 10/2018 | Jain | G06F 3/065 |
| 10,379,967 B2 | 8/2019 | Wade | |
| 10,394,560 B2 | 8/2019 | Malyugin | |
| 10,474,542 B2* | 11/2019 | Mitkar | G06F 11/3006 |
| 10,481,984 B1* | 11/2019 | Semyonov | G06F 11/1466 |
| 10,552,610 B1 | 2/2020 | Vashisht | |
| 11,159,550 B1* | 10/2021 | Wawda | H04L 63/306 |
| 11,500,661 B2* | 11/2022 | Ajila | G06F 9/45537 |
| 11,526,410 B2 | 12/2022 | Mitkar | |
| 11,663,092 B2 | 5/2023 | Meadowcroft | |
| 2004/0199828 A1* | 10/2004 | Cabezas | G06F 11/079 714/39 |
| 2008/0077988 A1* | 3/2008 | Small | G06F 11/3476 726/22 |
| 2008/0133208 A1* | 6/2008 | Stringham | G06F 11/0712 703/20 |
| 2009/0288167 A1* | 11/2009 | Freericks | G06F 21/554 726/23 |
| 2010/0088699 A1* | 4/2010 | Sasaki | G06F 8/63 718/1 |
| 2010/0107158 A1 | 4/2010 | Chen | |
| 2010/0180092 A1* | 7/2010 | Rajaa | G06F 16/10 711/E12.001 |
| 2012/0011397 A1* | 1/2012 | Murakami | G06F 11/0712 714/E11.132 |
| 2012/0151202 A1* | 6/2012 | Clerc | G06F 9/441 713/2 |
| 2012/0203895 A1* | 8/2012 | Jaudon | G06F 11/3438 709/224 |
| 2012/0311106 A1* | 12/2012 | Morgan | H04L 41/0806 709/220 |
| 2013/0247045 A1* | 9/2013 | Fitzgerald | G06F 9/455 718/1 |
| 2014/0115285 A1* | 4/2014 | Arcese | G06F 9/45533 711/162 |
| 2014/0195753 A1* | 7/2014 | Khatri | G06F 3/0619 711/162 |
| 2014/0258238 A1* | 9/2014 | Jin | G06F 9/45558 707/649 |
| 2014/0331277 A1* | 11/2014 | Frascadore | G06F 9/45558 726/1 |
| 2015/0067143 A1* | 3/2015 | Babakhan | H04L 63/1433 709/224 |
| 2015/0286539 A1* | 10/2015 | Gupta | G06F 11/1464 714/19 |
| 2016/0019081 A1* | 1/2016 | Chandrasekaran | G06F 9/45558 718/1 |
| 2016/0063014 A1 | 3/2016 | Chelur | |
| 2016/0241573 A1* | 8/2016 | Mixer | G06F 21/53 |
| 2016/0292061 A1* | 10/2016 | Marron | G06F 11/362 |
| 2017/0090688 A1* | 3/2017 | Anderson | G06F 3/0482 |
| 2017/0147819 A1* | 5/2017 | Vasilenko | G06F 11/3079 |
| 2018/0039548 A1 | 2/2018 | Bryant | |
| 2018/0095610 A1* | 4/2018 | Wieder | G06F 3/0482 |
| 2018/0276085 A1* | 9/2018 | Mitkar | G06F 3/065 |
| 2021/0208923 A1* | 7/2021 | Hu | G06F 11/004 |
| 2022/0029902 A1* | 1/2022 | Shemer | H04L 41/0686 |
| 2022/0122087 A1* | 4/2022 | Gosset | G06Q 20/027 |

OTHER PUBLICATIONS

Grizzard et al., "Analysis of Virtual Machine Record and Replay for Trustworthy Computing", Johns Hopkins APL Technical Digest (Year: 2013).*

IBM, List of IBM Patents or Patent Applications Treated as Related, Appendix P, filed herewith, 2 pages.

Lawrence et al., "Automatic Snapshot Creation in Virtualized Computing", U.S. Appl. No. 18/410,101, filed Jan. 11, 2024, 51 pages.

Anonymous, "Automatically create snapshot before launching VirtualBox VM?", Super User, 2 pages, downloaded from the Internet on Oct. 24, 2023, <https://superuser.com/questions/297808/automatically-create-snapshot-before-launching-virtualbox-vm>.

Anonymous, "How to automate vm snapshot creation using csv and schedule automatic deletion of the snapshot using VRO 8", VMware Code, downloaded from the Internet on Sep. 6, 2023, 5 pages, <https://vmwarecode.com/2021/05/11/how-to-automate-creation-deletion-of-snapshot-using-vro-8/>.

Anonymous, "SnapShot Master—Manage and automate VMWare or Hyper-V Snapshots", Smikar Software, downloaded from the Internet on Sep. 6, 2023, 7 pages, <https://www.smikar.com/snapshot-master/>.

Anonymous, "Using VMware Fusion", VMWare Inc., Copyright 2022, 213 pages, <https://docs.vmware.com/en/VMware-Fusion/13/com.vmware.fusion.using.doc/GUID-15205867-66D9-42A6-9ACE-8E0B6ACC02D9.html>.

Anonymous, "Virtual machine snapshots in Intelligent Infrastructure (II)", downloaded from the Internet on Oct. 24, 2023, 3 pages, <https://kb.iu.edu/d/bhno>.

Anonymous, "What are virtual machines (VMs)?", IBM, downloaded from the Internet on Nov. 13, 2023, 18 pages.

* cited by examiner

PRESERVING CHANGES WHEN REVERTING BACK TO A SNAPSHOT

BACKGROUND

The present disclosure relates to virtualized container environments, and more specifically, to automatically preserving desired changes when reverting back to a previous snapshot.

The development of the EDVAC computer system of 1948 is often cited as the beginning of the computer era. Since that time, computer systems have evolved into extremely complicated devices. Today's computers are much more sophisticated than early systems, such as the EDVAC. Modern computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One example of such sophisticated computer software is the virtualized container environment (VCE). A VCE generally refers to a software implementation of a physical, hardware computing system (i.e., a physical computer) that allows access to the computing resources and/or devices of the physical computer in a functional manner, no matter what their physical layout and/or location physically is.

The two most familiar types of VCEs are virtual machines (VMs) and containers. VCE are often referred to as a guest, while the physical machine on which they run is referred to as the host. VCEs can be stored as "images." A new active instance of the VCE can be instantiated from an image.

VCE's may be desirable in a variety of applications and roles, ranging from support of older operating system environments to power savings to virtual lab managers to isolation/encapsulation in multi-tenant environments.

SUMMARY

One aspect of this disclosure is a method for automatically managing snapshots of applications of interest in virtualized container environment (VCE). One embodiment of the method may comprise intercepting an action-of-interest directed to an application-of-interest within a VCE. The method may further comprise automatically capturing a snapshot of the VCE before executing the intercepted action-of-interest. The method may further comprise executing the intercepted action-of-interest. The method may further comprise automatically deleting the snapshot after a predetermined time period following the intercepted action.

Another aspect of the disclosure is a system for automatically managing snapshots of applications of interest in virtualized container environment (VCE). One embodiment of the system may comprise one or more processors; and a memory communicatively coupled to the one or more processors. The memory may comprise instructions which, when executed by the one or more processors, cause the one or more processors to perform a method comprising intercepting an action-of-interest directed to an application-of-interest within a VCE. The method may further comprise automatically capturing a snapshot of the VCE before executing the intercepted action-of-interest. The method may further comprise executing the intercepted action-of-interest. The method may further comprise automatically deleting the snapshot after a predetermined time period following the intercepted action.

Another aspect of the disclosure is a computer program product for automatically managing snapshots of applications of interest in virtualized container environment (VCE). One embodiment of the computer program product may comprise a computer readable storage medium having program instructions embodied therewith. The program instructions may be executable by a computer to perform a method comprising intercepting an action-of-interest directed to an application-of-interest within a VCE, wherein the action-of-interest is chosen from the group consisting of a configuration change to one or more applications executing in the VCE and a change in an operating system (OS) configuration, and wherein intercepting of the action-of-interest comprises defining one or more hooks in an operating system of the VCE, defining one or more process handles and events associated with the application-of-interest, and monitoring instructions entering virtualized hardware drivers. The method may further comprise automatically capturing a snapshot of the VCE before executing the intercepted action-of-interest. The method may further comprise executing the intercepted action-of-interest. The method may further comprise automatically deleting the snapshot after a predetermined time period following the intercepted action, wherein the predetermined time period is configurable by the user with respect to each of a plurality of applications-of-interest.

Another aspect of the disclosure is method for preserving actions taken after a snapshot. One embodiment of the method may comprise capturing a snapshot of a virtualized container environment (VCE), the VCE comprising one or more applications-of-interest. The method may further comprise intercepting an event-of-interest directed to an application-of-interest within the VCE. The method may further comprise automatically storing the intercepted event in an action database. The method may further comprise, in response to a user instruction to revert the VCE to a prior snapshot, generating an automated script from the intercepted events, wherein the automated script comprises actions that occurred in the VCE after capture of the selected snapshot; and executing the automated script.

Another aspect of the disclosure is system for preserving actions taken after a snapshot. One embodiment of the system may comprise one or more processors, and a memory communicatively coupled to the one or more processors. The memory may comprise instructions which, when executed by the one or more processors, cause the one or more processors to perform a method. The method may comprise capturing a snapshot of a virtualized container environment (VCE), the VCE comprising one or more applications-of-interest. The method may further comprise intercepting an event-of-interest directed to an application-of-interest within the VCE. The method may further comprise automatically storing the intercepted event in an action database. The method may further comprise, in response to a user instruction to revert the VCE to a prior snapshot, generating an automated script from the intercepted events, wherein the automated script comprises actions that occurred in the VCE after capture of the selected snapshot, and executing the automated script.

Another aspect of the disclosure is a computer program product for preserving actions taken after a snapshot. One embodiment of the computer program product may comprise a computer readable storage medium having program instructions embodied therewith. The program instructions may be executable by a computer to perform a method comprising capturing a snapshot of a virtualized container environment (VCE), the VCE comprising one or more applications-of-interest. The method may further comprise intercepting an event-of-interest directed to an application-of-interest within the VCE. The method may further comprise automatically storing the intercepted event in an action database. The method may further comprise, in response to a user instruction to revert the VCE to a prior snapshot, presenting the stored events to the user by a user interface, highlighting one or more of the intercepted events in the user interface as higher risk, wherein the higher risk events comprise changes by other applications to a file used by one or more of the applications-of-interest. The method may further comprise, in response to a user instruction to revert the VCE to a prior snapshot, receiving, by the user interface, a sub-selection of the stored events to be replayed, and receiving, by the user interface, one or more modifications to the stored events. The method may further comprise, in response to a user instruction to revert the VCE to a prior snapshot, modifying the identified stored events, wherein the modifications comprise changes to one or more variables associated with at least one of the stored events, generating the automated script from the modified sub-selection, and executing the automated script. The automated script may comprise a modified sub-selection of actions that occurred in the VCE after capture of the selected snapshot, and the automated script may comprise replays the events-of-interest in a same chronological order as they occurred in the VCE.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
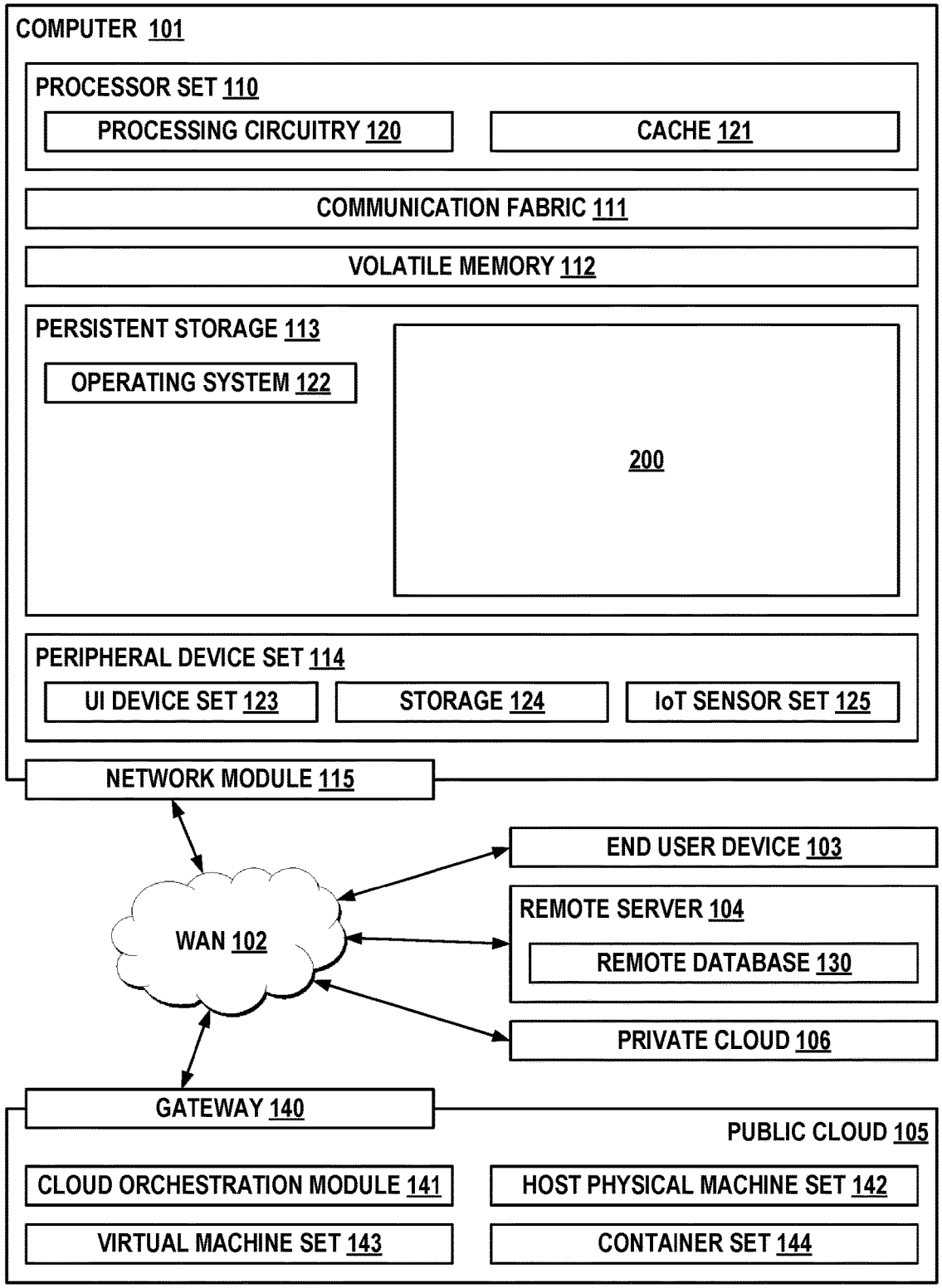
FIG. 1 depicts an example computing environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to virtualized container environments, more particular aspects relate to automatically preserving desired changes when reverting back to a previous snapshot. While the present disclosure is not necessarily limited to such applications, various aspects of the disclosure may be appreciated through a discussion of various examples using this context.

Many computing systems today utilize virtualized computing environments (VCEs). Two familiar types of VCEs are virtual machines (VMs) and containers. A container is a VCE that uses operating-system-level virtualization. This refers to an operating system feature in which the kernel allows the existence of multiple isolated user-space instances called containers. These isolated user-space instances typically behave as real computers from the point-of-view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a technical feature that is known as containerization.

A virtual machine (VM) is a VCE that creates a virtual representation of a physical computing system. Some implementations may allow the creation of multiple VMs on a single physical computing system, each with their own operating system (OS) and applications. A VM typically does not interact directly with the physical computing resources of the physical computing system, such as the processors, memory, and storage. Instead, the VM may utilize a lightweight software layer called a "hypervisor" to coordinate communication between the VM(s) and the underlying physical hardware. The hypervisor, in turn, typically keeps each VM separate from the others such that they do not interfere with each other and cannot access each others' resources.

When a hypervisor is used on a server-class computing system (sometimes also referred to as a bare metal server), the hypervisor may allow the physical computer to separate its operating system and applications from its hardware. Then, the physical computer can divide itself into several independent VMs. Each of these new virtual machines may then run their own OS and applications independently, while still sharing the original resources from the bare metal server, which the hypervisor manages. Those resources may include memory, RAM, storage, etc. In this way, the hypervisor acts like a traffic cop of sorts, directing and allocating the bare metal server's resources to each of the various new VMs, ensuring they do not disrupt each other.

There are two primary types of hypervisors: type 1 hypervisors and type 2 hypervisors. Type 1 hypervisors typically run directly on the physical hardware (usually a server), taking the place of the OS. Typically, system administrators use a separate software product to create and manipulate VMs on the hypervisor, called a virtualization platform. Some management tools may allow the administrator to select a guest OS to install in the VM. The VM, in turn, typically allows for use of one VM to be saved as an image and used as a template for others, effectively duplicating the VM to create new ones. For example, depending on the system's use case, the administrator might create multiple VM templates for different purposes, such as software testing, production databases, and development environments.

Type 2 hypervisors typically run as an application within a host OS, and usually target single-user desktop or notebook platforms. With a Type 2 hypervisor, users typically manually create a VM and then install a guest OS in it. Users can use the hypervisor to allocate physical resources to the VM, setting the amount of processor cores and memory it can use. Depending on the hypervisor's capabilities, the user can also set options like 3D acceleration for graphics.

VCEs may offer several technical benefits over traditional, hardware-focused computing, including:

Resource utilization and improved ROI: Because multiple VCEs run on a single physical computer, users and administrators do not have to buy a new computing system every time they want to run another OS, and they can get more return from each piece of hardware they already own.

Scale: With cloud computing, it is easy to deploy multiple copies of the same virtual machine to better serve increases in load.

Portability: VCEs can be relocated as needed among the physical computers in a network. This makes it possible to allocate workloads to servers that have spare computing power. VCEs can even move between on-premises and cloud environments, making them useful for hybrid cloud scenarios, in which computing resources are shared between a data center and a cloud service provider.

Flexibility: Creating a VCE is typically faster and easier than installing an OS on a physical server because the VCE can be cloned with an OS already installed. Developers and software testers can create new environments on demand to handle new tasks as they arise.

Security: VCEs may improve security when compared to an OS running directly on hardware. For example, an entire snapshot of the VCE can be created a point-in-time, and then restored to that state if it becomes infected with malware, effectively taking the VCE back in time. The fast, easy creation of VCEs also makes it possible to completely delete a compromised VCEs and then recreate it quickly, hastening recovery from malware infections.

VCEs have many practical applications both for enterprise IT administrators and end users, including:

Cloud computing: For the last 10+ years, VCEs have been the fundamental unit of compute in cloud, enabling dozens of different types of applications and workloads to run and scale successfully.

Supporting DevOps: VCEs are a desirable technology to support enterprise developers, who can configure VCEs templates with the settings for their software development and testing processes. The developers can create VMs for specific tasks such as static software tests, including these steps in an automated development workflow. This all helps streamline the DevOps toolchain.

Testing: A VCE may allow users and administrators to test-drive software and/or new versions of the OS on their computing system with minimal risk.

Investigate malware: VCEs may be used by malware researchers to isolate malicious programs during testing.

Running incompatible software: Some users may prefer one OS while still needing a program that is only available in another. For example, if a software vendor has discontinued the version of its product for one OS, a user may still use a desktop-focused hypervisor to run that software to run the vendor's product in a VCE running a different OS, giving the user access to that software.

Browsing securely: Using a virtual machine for browsing enables users to visit sites without worrying about infection. For example, a user can take a snapshot of their machine and then roll back to it after each browsing session e.g., using a Type 2 desktop hypervisor. Alternatively, an admin could provide a temporary virtual desktop located on the server.

In cloud computing, VCEs may be offered in both single-tenant and multi-tenant variations. In public (or multi-tenant) environments, VCEs may enable multiple users to share common physical infrastructure. This is often the most cost effective and scalable approach to provisioning VCEs, but may lacks some of isolation characteristics that organizations with strict security or compliance mandates might prefer.

Two models for single-tenant VCEs include dedicated hosts and dedicated instances. A dedicated host typically involves renting an entire physical computing system and maintaining sustained access to and control over that machine, its hardware, and whatever software is installed on it. This model provides the maximum amount of hardware flexibility and transparency, workload control and placement, and also offers some advantages for certain bring-your-own license software. A dedicated instance, in contrast, offers the same single-tenant isolation and the same control over workload placement, but it is not coupled with a specific physical computing system. So, for example, if a dedicated instance is re-booted, it could wind up on a new physical computing system, potentially in a different physical location.

While VMs and containers offer many advantages, their increasing use has created new challenges in the field of information technology (IT). For example, when using a long-running VCE, either locally or cloud-based, users and/or admins may unintentionally leave the VCE running for a long time between taking "snapshots." A snapshot, in turn, generally refers both methods for storing a state of the VCE at a particular point in time, and resulting files that result from those methods. In the context of this disclosure, the snapshot may include the current state of the VCE and all its related data. In some embodiments, the operation of a VCE and its program(s) may be frozen at a specific point in time, during which the snapshot is created. In other embodiments, the snapshot may be taken while the VCE continues to perform tasks. Subsequent changes to the VCE may then be added to the snapshot via a series of updates.

Snapshots may be desirable in many information technology applications because they may allow for saving the state of a particular VCE so that, at any later time, that VCE can be rolled-back to that earlier, saved state. The terms 'restore,' 'revert' or 'reverting back,' in turn, may denote a roll-back to a previous point in time. The roll-back may include related data to programs that are part of the snapshot.

Despite these advantages, one problem of allowing a long-running VCE to go too long between snapshots is that a reconfiguration event (e.g., OS configuration changes, OS updates, application changes, application updates, application install/uninstall, etc.) in the VCE may cause the VCE to become unstable or otherwise behave undesirably. Undesirable behavior can present itself to the user following changes to the VCE state resulting in an unexpected termination, data loss, decrease in performance, etc. While the user and/or admin can roll-back the VCE to the most recent snapshot preceding a change that was causing a problem, if that snapshot is old, that user and/or admin will also have to redo all the (desired/good) actions that had been done after the snapshot was taken, but before the problematic reconfiguration event. While it is technically possible to take very frequent snapshots, each snapshot takes up valuable storage space, and the creation of the snapshot itself consumes considerable computing resources (e.g., processor cycles, network bandwidth). Worse, if those snapshots are scheduled (i.e., automatic and periodic), then most of those valuable resources end up being wasted on unneeded snapshots.

Accordingly, some embodiments of this disclosure may include a virtualization environment that automatically, and without user invention, takes a snapshot upon the occurrence of one or more events-of-interest. These events-of-interest may be individually specified (e.g., configured by the end user and/or IT administrator via a user interface) for each of a plurality of different application-of-interest. Examples of 'applications of interest' could include, but are not limited to, RegEdit, InstallShield™, Control Panel, a bespoke piece of software, and/or the VCE's operating system (if any). After a configurable "breaking-in" period (e.g., an hour, a day, a week), the virtualization environment may then automatically delete the snapshot to free up resources. This breaking-in period may also be customized for each of the one or more different events-of-interest and/or for each the one or more applications-of-interest.

Some embodiments may intercept an action-of-interest inside a VCE (i.e., before the action-of-interest is performed by the VCE). The virtualization environment may then automatically and immediately take a snapshot. After the snapshot is created, the VCE may then allow the action-of-interest to be performed.

Some embodiments may automatically monitor the VCE to determine that it is operating normally/acceptably for a configurable "breaking-in" period of time, and then may automatically delete the snapshot to free up resources. The configurable period of time can be defined differently depending on the type of event-of-interest and/or application-of-interest, as can the variables monitored for determining whether the VCE is operating normally/acceptably. For example, if the event-of-interest was an OS configuration change, then some embodiments may monitor an "Event Viewer" subsystem, a system logging subsystem, etc. for warnings/errors, and if none appear for at least the configurable "breaking-in" period-of-time, the event-of-interest can be considered as successful (i.e., desired by the user and/or admin). In response, the snapshot may then be automatically deleted. As another example, if the event-of-interest was an application installation, then the breaking-in period can consider the above factors, and additionally monitor installed usage of the application. In this example, the "breaking-in" period of time may involve the use of the installed application-of-interest (vs. the VCE) for at least a configurable number of hours. If it is successfully used for the configurable amount of time without errors, then the application-of-interest install can be considered as successful. In response, the snapshot may be automatically deleted.

Some embodiments may be implemented via the guest additions to the VCE and/or via hooks inside the VM OS to trigger creation of the snapshot by the VCE. Advantageously, this may enable interception of the events-of-interest before they are executed by the VM/VCE. Additionally, some embodiments may utilize system logs to establish that a particular event-of-interest that triggered a particular snapshot was successful, and in response, automatically remove that particular snapshot. Advantageously, this may enable the VCE to automatically decide if the protection provided by said snapshot is no longer necessary, thus removing the artifacts of the protection (e.g., freeing up the associated disk space).

In some embodiments, the snapshots are taken only when highly beneficial (e.g., before a user-driven action-of-interest takes effect that may put the VCE in an undesirable state). This has the beneficial effect of saving system resources, e.g., disk space, CPU time, required for the snapshot protection system. That is, although embodiments may use storage to store the snapshot, that storage is only utilized until the event-of-interest is deemed successful. Once the event-of-interest has been deemed successful, the snapshot may be automatically removed. This has the beneficial effect of freeing the storage space associated with the snapshot for other use.

Some embodiments may intercept a configurable list of actions-of-interest from a configurable list of applications-of-interest to trigger snapshot creation by the virtualization platform. The actions-of-interest may be intercepted by monitoring one or more subsystems, such as an event viewer. Some embodiments may then store that snapshot for a configurable time period to indicate the success of the specific event-of-interest, e.g., changes of state within an OS. Additionally and/or alternatively, the configurable time period may be dynamic depending on application usage, e.g., deletion is not triggered until the user has used a specific application-of-interest for at least a configurable amount of time. In this way, the removal of VM snapshots may be beneficially based upon the success of state change of the event-of-interest.

Some embodiments may detect actions-of-interest and/or determine that an application/VCE is performing acceptably using a trained neural network. The neural network may be initially trained using system logs from VCE(s) that have had subsequent performance issues, such as crashes. The neural network may subsequently be retrained on/updated using the system logs from a particular VCE. This retraining/updating may customize the neural network for that particular operational environment. For example, the neural network may be customized for what is the normal processor load for the particular VCE(s) it monitors, which processes normally run and in which orders, how long those processes normally run, etc. This may have the beneficial effect of providing a snapshot of the protection that is automatically customized for how a particular VCE is being used by a particular user.

One feature and advantage of some embodiments is that, if an event-of-interest causes an undesired outcome, these embodiments may substantially guarantee that a snapshot was taken shortly before that event-of-interest was performed. This has the beneficial effect of reducing, or even minimizing, the amount of lost work.

One feature and advantage of some embodiments is that they may map snapshots to an installation of specific software for/by a specific user. Some of these embodiments may automatically decide to take snapshots as a background process for a variety of applications, and may delete those snapshots after a configurable break-in period. In this way, some embodiments may automatically trigger snapshots based on actions in the VCE before they are performed, and then automatically remove the resulting artifacts after a proven period-of-grace.

Turning now to the figures, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as virtualization environment 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) may take the form of virtual machines (VMs) from a virtual machine set 143 and/or containers from container set 144. It is understood that these VCEs may be stored as images and may be transferred among and between the various physical machine hosts, either as images or after instantiation of the VCE. Cloud orchestration module 141 may manage the transfer and storage of these images, deploys new instantiations of VCEs and manages active instantiations of VCE deployments. Gateway 140 may be a collection of computer software, hardware, and firmware that allows public cloud 105 to communicate through WAN 102.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
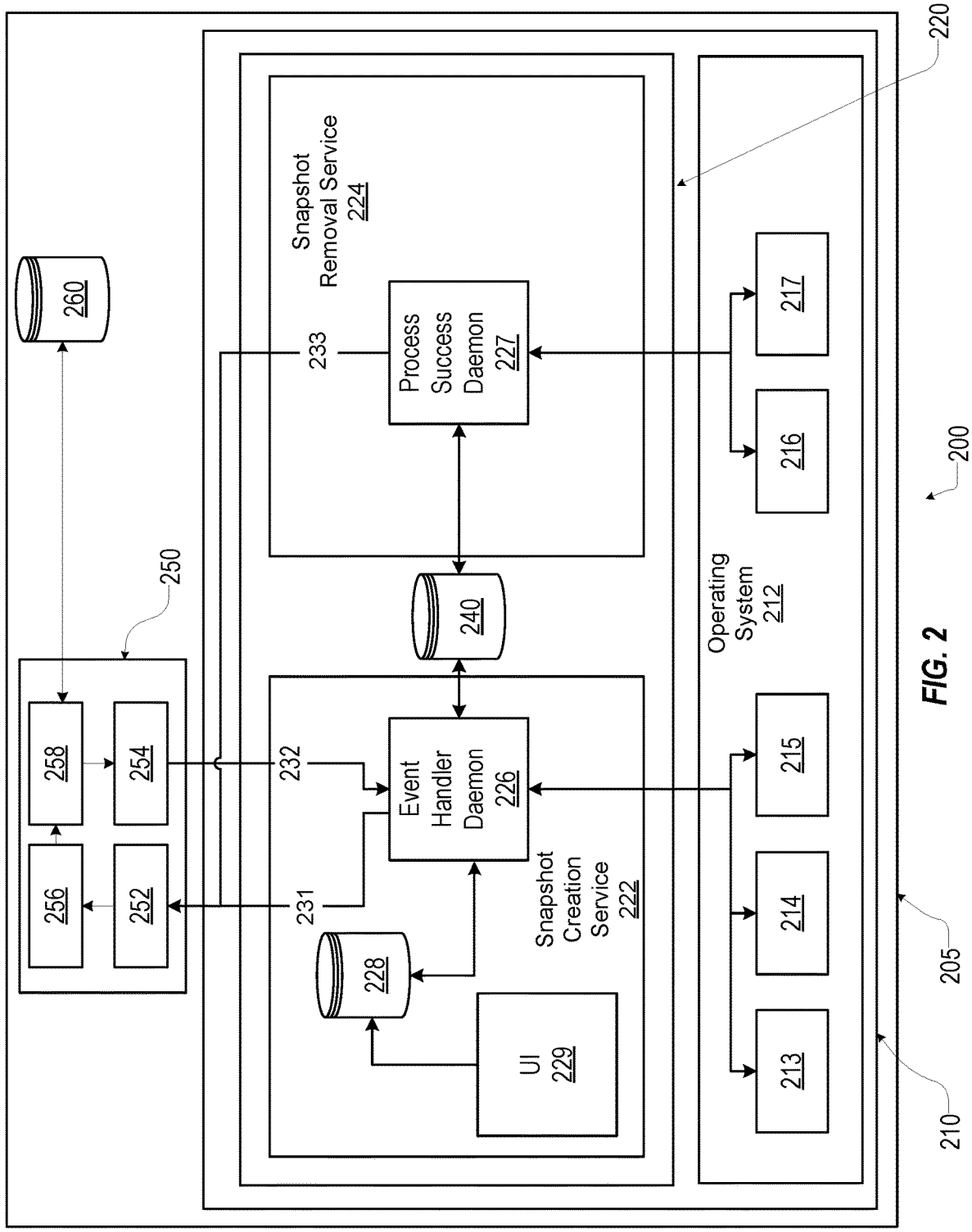
FIG. 2 is a schematic view of a first embodiment of the virtualization environment of FIG. 1, consistent with some embodiments and described with reference to VM-type VCEs.

FIG. 2 is a schematic view of a first embodiment of the virtualization environment 200 of FIG. 1, consistent with some embodiments and described with reference to VM-type VCEs. The virtualization environment 200 may comprise a virtualization platform 205, such as IBM Cloud, VMWare, VirtualBox, or Amazon Web Services (AWS), executing on physical computer 101 inside computing environment 100 (see FIG. 1). The virtualization environment 200 may manage one or more VCEs (such as VM 210), a snapshot service 250, and cloud storage 260. Each VM 210 may include an OS 212. The VM 210 may further comprise guest OS additions 220. The guest OS additions 220, in turn, may comprise a snapshot creation service 222, a snapshot removal service 224, and a changes database 240.

The OS 212 in this embodiment may include an event handler 213, a plurality of virtualized hardware drivers 214 (one shown for clarity), a process monitor 216, and an event viewer 217. The OS 212 may also contain one or more hooks 215 that generate messages in response to one or more events-of-interest, such as an instruction to perform a reconfiguration event, in the VM 210. The hooks 215, in turn, may modify or augment the behavior of the OS 212 by intercepting function calls, messages, or events passed between the various components of the VM 210. Suitable examples of hooking include, without limitation, EasyHook™, Detours™, and LD_PRELOAD.

The virtualized hardware drivers 214 may be any software system that helps the OS 212 interact with one or more virtualized devices (not shown). For example, for a virtualized hard disk device, every single read/write operation may be passed from the OS 212 to a particular one of the virtualized drivers 214 associated with that particular virtualized hard disk. The virtualized driver 214, in turn, may generate instructions to perform the associated operations on the physical hard disk itself (not shown). The interception of read/writes, in turn, may trigger one or more of process(es) described in more detail below.

The snapshot creation service 222 may comprise an event handler daemon 226 that monitors any or all of: the event handler 213, the virtualized hardware drivers 214, and the hooks 215 to detect events-of-interest. In particular, some embodiments may monitor some or all of the following: hooking (e.g., EasyHook, Detours, LD_PRELOAD, etc.); process handles (window, file, etc.) and events; and monitoring instructions entering virtualized hardware drivers (e.g., central processing unit drivers, hard disk drivers, etc.) The detected events-of-interest, in turn, may comprise an event chosen from a configurable list of events, such as an OS configuration change, an OS update, an application configuration change, an application update, an application install, an application configuration change, an application uninstall, a process launch, etc. In some embodiments, the configuration events may also comprise various higher-risk activities, such as requesting superuser privileges to perform an action that requires said privileges. Additionally or alternatively, some embodiments may automatically detect events-of-interest using a trained neural network, such as neural network 500, that monitors e.g., the event handler 213, the virtualized hardware drivers 214, and the hooks 215. This trained neural network may be further customized to detect patterns of events that occur inside a particular VM 210.

The event handler daemon 226 in some embodiments may compare the detected events-of-interest in an applications/processes-of-interest database 228. The applications/processes-of-interest may be configured, or otherwise managed, via a user interface (UI) 229. Any events-of-interest detected by the event handler daemon 226 may be timestamped and stored in the changes database 240. In response to a detected event-of-interest, the event handler daemon 226 may also generate a create snapshot message 231 and send the create snapshot message 231 to the snapshot service 250.

The snapshot removal service 224 in some embodiments may comprise a process success daemon 227. The process success daemon 227 may monitor the performance of the VM 210, e.g., various system logs generated thereby, to determine whether or not the event-of-interest produced undesired behavior (e.g., error messages of unusual type or quantity). In some embodiments, this may also include analyzing messages from the event viewer 217, analyzing information from analyzing output from the process monitor 216 (e.g., sysinternals, process monitor, etc.) If the process success daemon 227 determines that a reconfiguration event has not produced any undesired behavior for at least a configurable amount of time, then the snapshot removal service 224 may generate a delete snapshot message 233 and send it to the a snapshot service 250. The snapshot removal service 224 may comprise a trained neural network 500 in some embodiments.

The snapshot service 250 in some embodiments may include a guest additions comms channel upstream manager 252, a guest additions comms channel downstream manager 254, a snapshot message manager 254, and a snapshot manager 258. The comms channel upstream manager 252 in some embodiments may receive a snapshot creation message 231 from the event handler daemon 226, and in response, generate a snapshot message to action 256 for the snapshot manager 258 to create a new snapshot. The snapshot manager 258, in turn, may create a new snapshot, store the new snapshot in snapshot storage 260, and return (via the guest additions comms channel down manager 254), a snapshot ID 232 to the event handler daemon 226. The event handler daemon 226 may then store the received snapshot ID in the changes database 240, along with an identifier and timestamp for the associated event-of-interest. In other embodiments, the snapshot message to action 256 could be eliminated, and instead, the channel upstream manager 252 could communicate directly to the snapshot manager 258.

Figure 3A:
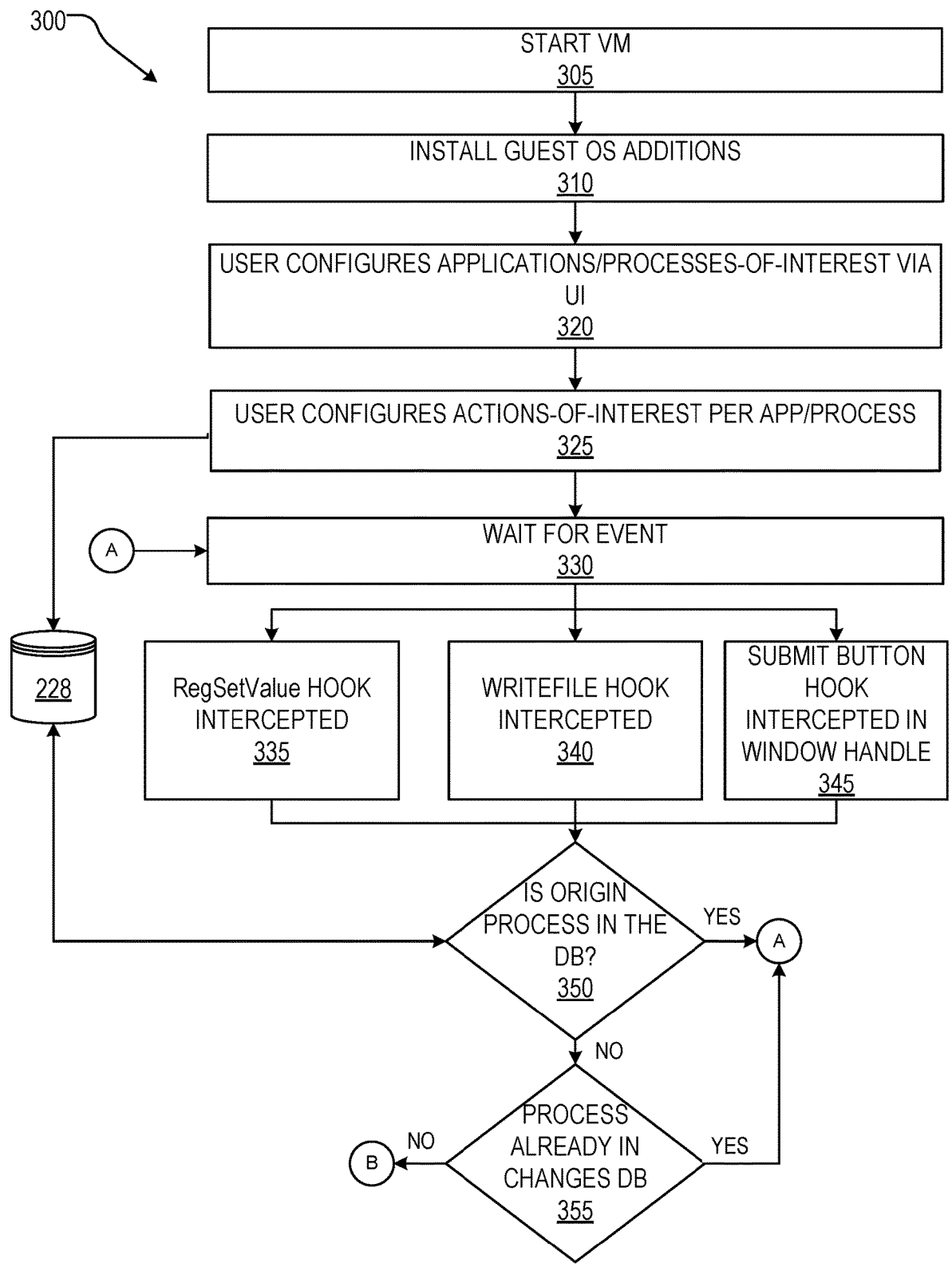
FIGS. 3A-3B are a flow chart illustrating the example snapshot creation service in FIG. 2, in operation.
Figure 3B:
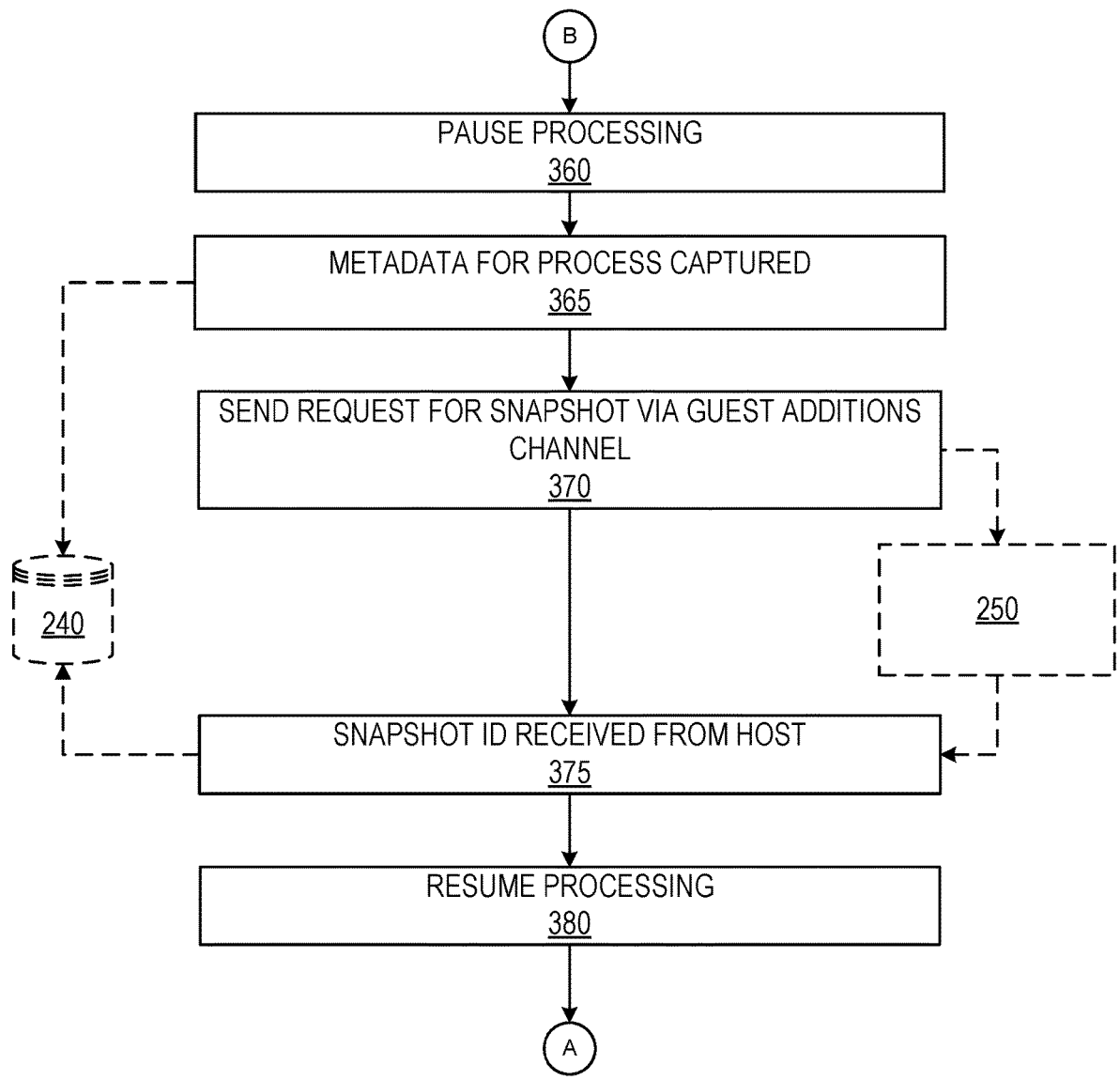

FIGS. 3A-3B are a flow chart 300 illustrating the example snapshot creation service 222 in FIG. 2 in operation. At operations 305-310, the VM 210 may be started and the guest OS additions 220 may be installed. Next, a user and/or admin may identify one or more applications/processes-of-interest, which may be registered with the event handler daemon 226 at operation 320. This registration may be performed via the UI 229 in some embodiments. The user and/or admin may also identify one or more actions-of-interest for each application/process-of-interest, which may also be registered with the event handler daemon 226 at operation 325, again via the UI 229 in some embodiments. The VM 210 may then begin waiting for one of the configured actions-of-interest to occur with respect to one of the applications/processes-of-interest at operation 330.

At operations 330-345, one or more of the configured actions-of-interest may be detected and intercepted by the event handler daemon 226. This may include intercepting a RegSetValue hook at operation 335, intercepting a WriteFile hook at operation 340, and/or intercepting a submit button hook in a window handle at operation 345. In response, at operation 350, the event handler daemon 226 may then determine whether or not the origin process of the detected/intercepted action-of-interest is already in the applications/processes-of-interest database 228.

If the event handler daemon 226 determines that the origin process is already in the database 228, flow continues to operation 355, where the event handler daemon 226 determines whether or not the origin process is already in the changes database 240. If not, then the event handler daemon 226 may first pause processing of the detected event-of-interest at operation 360. The event handler daemon 226 may then generate metadata for the new process (i.e., the one that generated the event-of-interest) at operation 365, and store that metadata in the applications/processes-of-interest database 228. The event handler daemon 226 then sends a request 213 for creation of a new snapshot (e.g., to the snapshot creation service 250) via the guest additions channel 252 at operation 370. The snapshot creation service 250 may respond by creating a new snapshot of the VM 210, storing the new snapshot in the snapshot storage 260, and returning an ID 232 for that new snapshot to the event handler daemon 226 via the guest additions comms channel downstream manager 254 (e.g., for storage in the changes database 240) at operation 375. The event handler daemon 226 may then allow normal processing of the event-of-interest to occur at operation 380. The VCE 210 responds by processing that event normally. Flow may then return to operation 330, where the event handler daemon 226 waits for a new event-of-interest to occur.

Figure 4A:
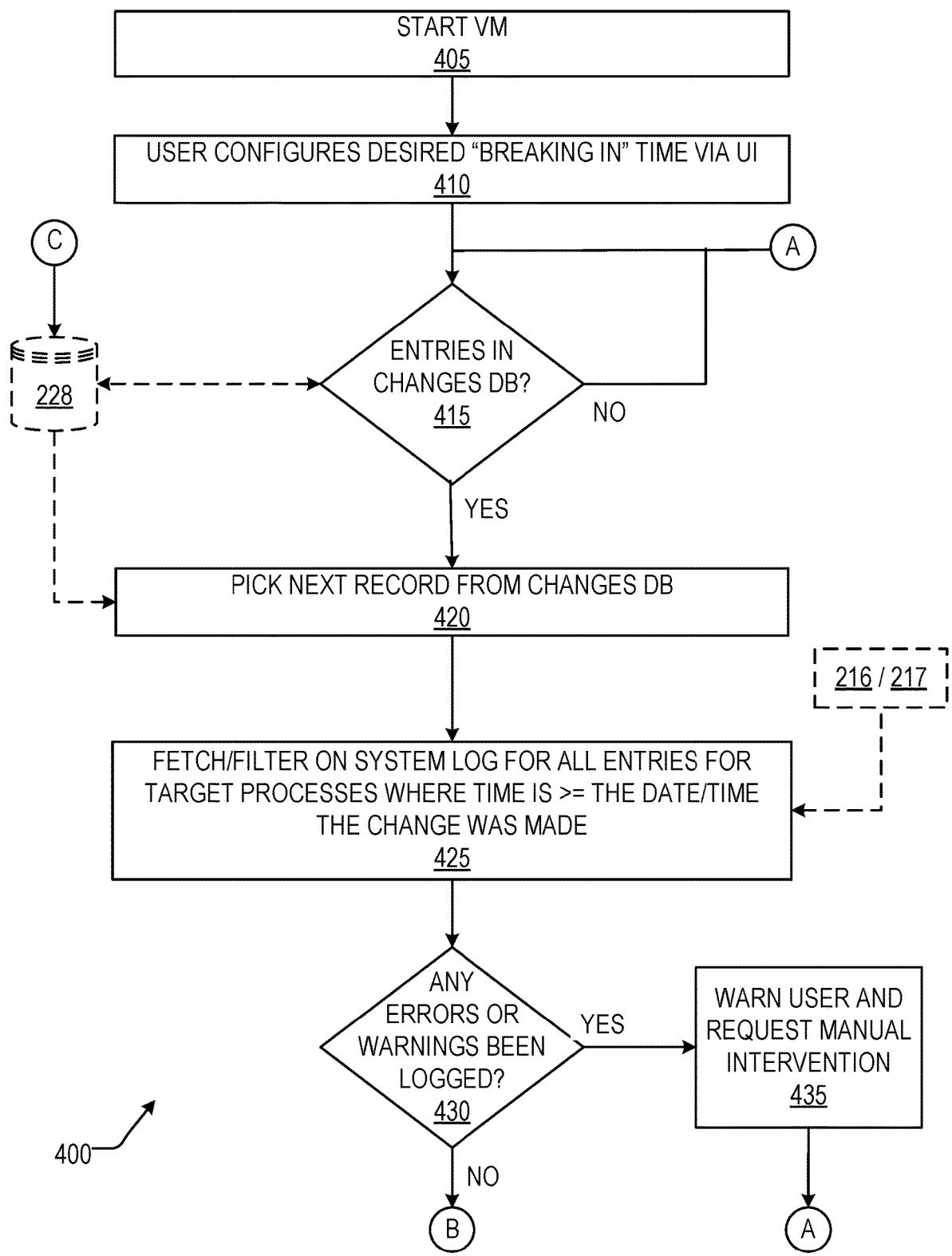
FIGS. 4A-4B are a flow chart illustrating an example snapshot removal service in FIG. 2 in operation.
Figure 4B:
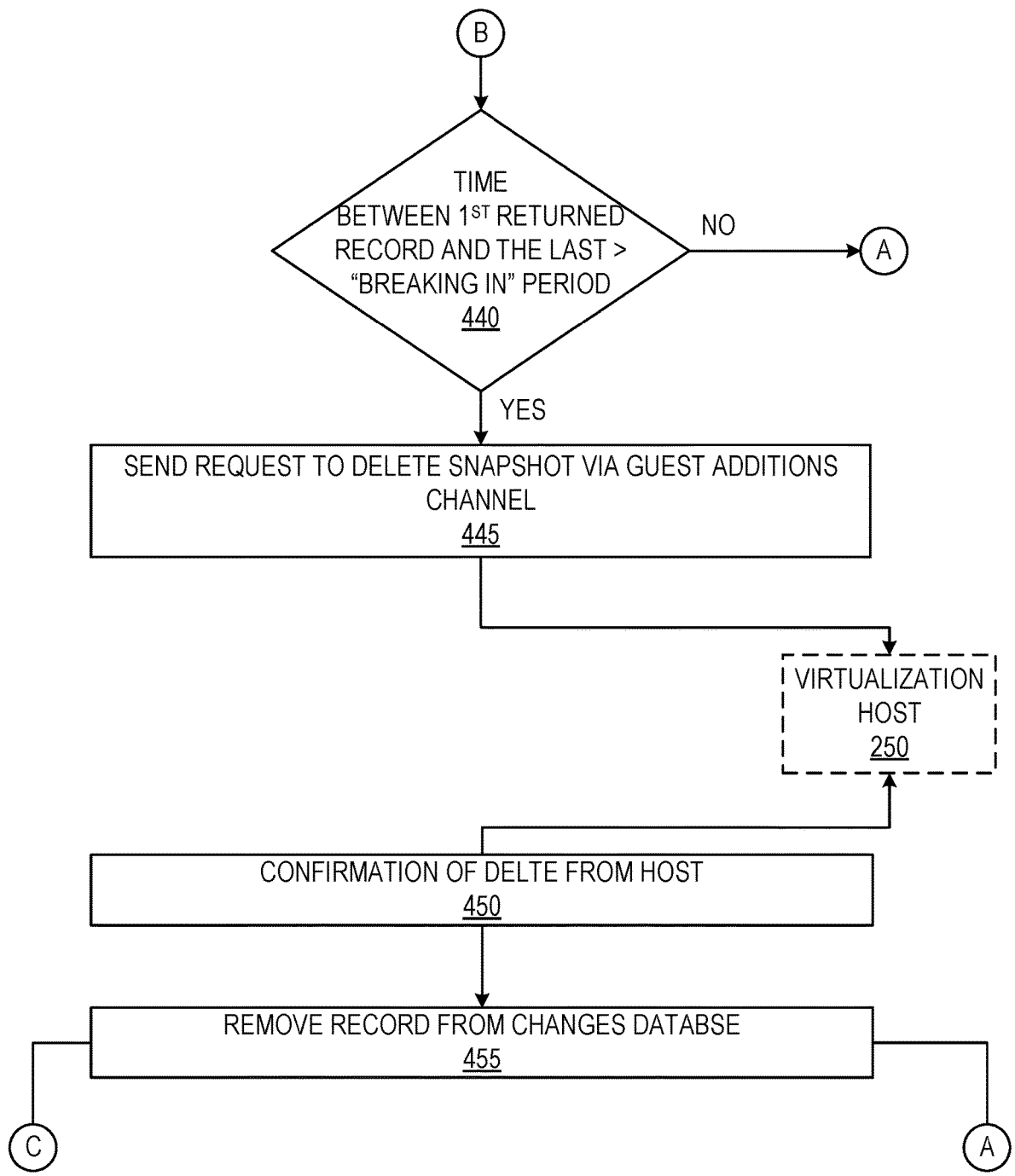

FIGS. 4A-4B are a flow chart 400 illustrating the example snapshot removal service 224 in FIG. 2 in operation. At operations 405-410, the VM 210 may be started and a user/administrator may specify one or more factors to be used to determine if an event-of-interest is to be deemed successful, e.g., a minimum breaking-in time period. At operation 415, the snapshot removal service 224 may query the changes database for any recent changes, e.g., changes that occurred less than the configured breaking-in period ago. If any recent changes exist, then at operations 420-425, the snapshot removal service 224 may query/filter the system log, etc., for all entries related to the application(s)/process(es) associated with the discovered recent change. This may include filtering the system log for entries for which an associated timestamp is newer or equal to the time at which the discovered recent change was made.

At operation 430, the snapshot removal service 224 may determine whether or not there were any errors and/or warnings in the filtered results that are associated with the discovered recent change. If so, the snapshot removal service 224 may warn the user/admin and request manual intervention/instructions at operation 435. If not, then the snapshot removal service 224 may determine at operation 440 whether the time period between the current time and the snapshot creation is greater than the specified breaking-in period. If so, then the snapshot removal service 224 may send, at operation 445, a request to the snapshot service 250 via the guest additions channel 252 to delete the associated snapshot. In response, the snapshot service 250 may delete the associated snapshot and respond with a confirmation message at operation 450. In response to that confirmation message, at operation 455 the snapshot removal service 224 may remove the associated record(s) from the changes database 240 and return to operation 415. Advantageously, embodiments may make these determinations based on messages logged in the system logs.

In some embodiments, various applications-of-interest may output log messages frequently and/or periodically. Some of these log messages may comprise errors/warnings. However, others may merely comprise informative messages that, e.g., indicate that a task completed successfully. Accordingly, some embodiments may also utilize a predetermined number of such informative log messages as evidence that the application is running smoothly. Other embodiments may use a trained neural network, such as neural network 500, to analyze the log messages. Advantageously, these embodiments may make these determinations based on messages logged in the system logs.

Figure 5A:
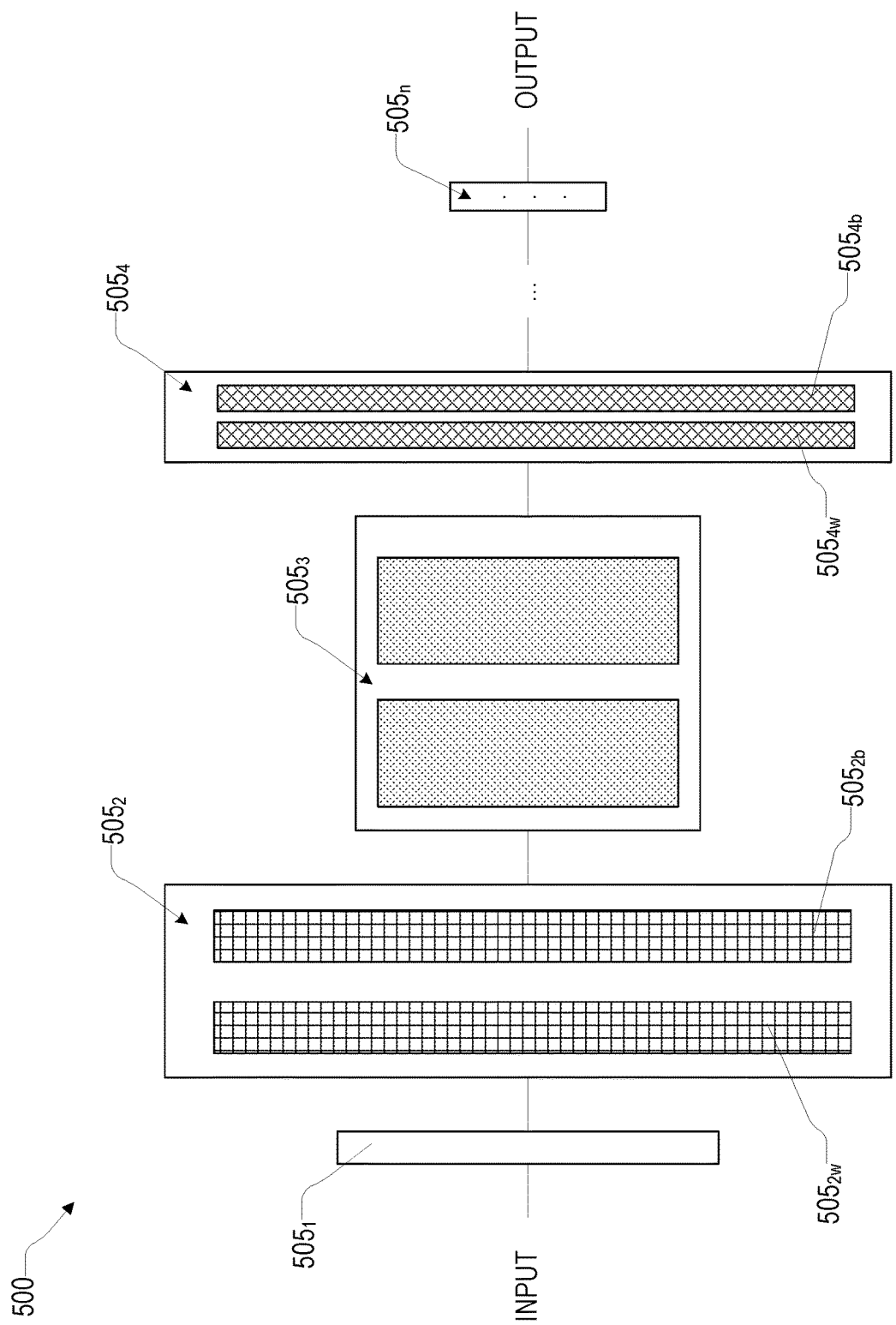
FIG. 5A illustrates an example neural network, consistent with some embodiments.
Figure 5B:
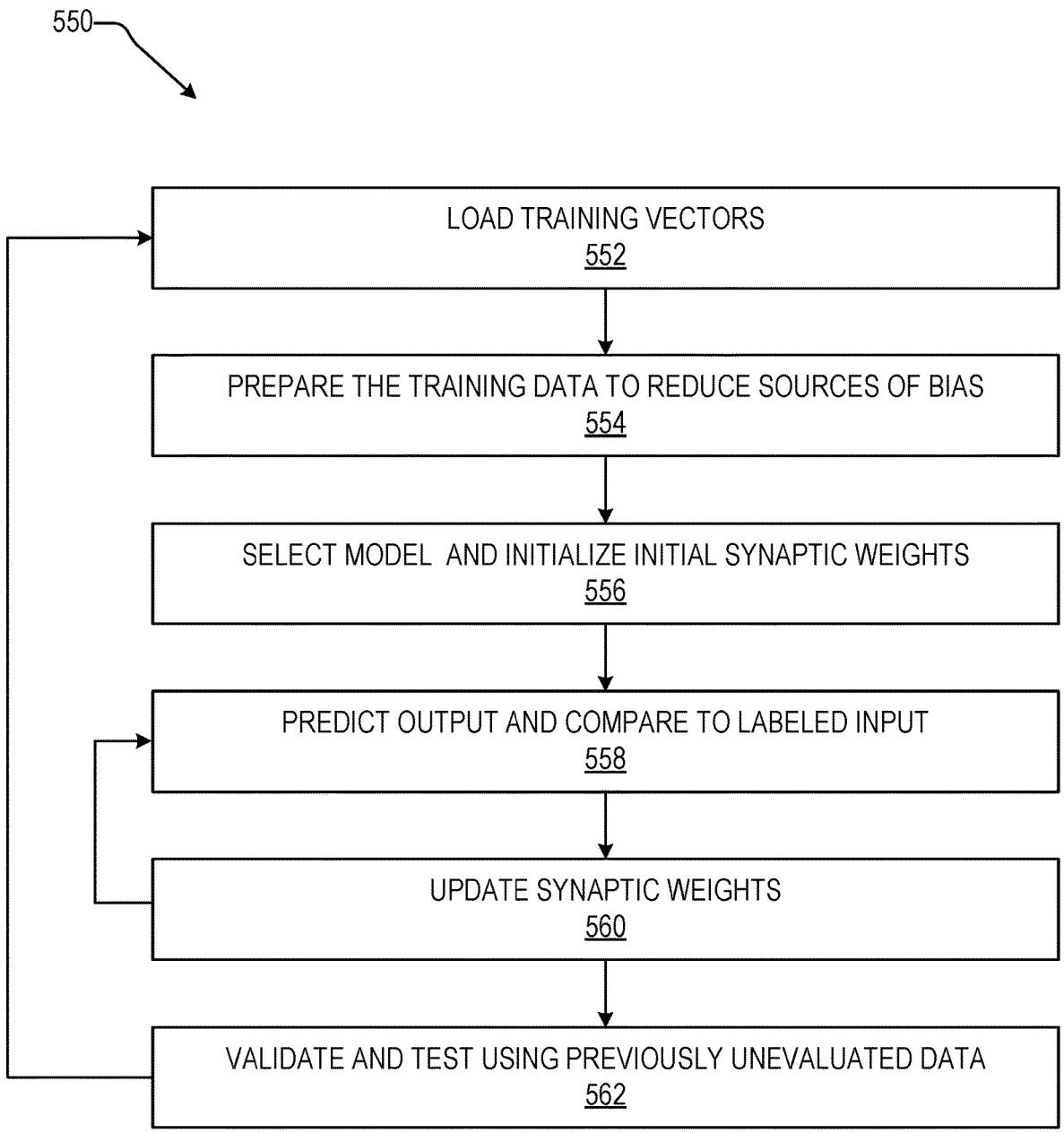
FIG. 5B depicts a neural network training method, consistent with some embodiments.

FIGS. 5A-5B illustrate a neural network 500 that may be used by the snapshot creation service 224 to identify events-of-interest and/or by the snapshot removal service 226 to determine whether a previous event-of-interest is acting desirably, consistent with some embodiments. The neural network 500 may be any software system that recognizes patterns. In some embodiments, the neural network 500 comprise a plurality of artificial neurons interconnected through connection points called synapses or gates. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The neural network 500 may be trained to solve a specific problem (e.g., detecting an event-of-interest) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers.

More specifically, FIG. 5A illustrates an example neural network 500, consistent with some embodiments. The neural network 500 may comprises a plurality of layers $505_1$-$505_n$. Each of the layers may comprise weights $505_{1w}$-$505_{nw}$ and biases $505_{1b}$-$505_{nb}$ (only some labeled for clarity). The layer $505_1$ that receives external data is the input layer. The layer $505_n$ that produces the ultimate result is the output layer. Some embodiments include a plurality of hidden layers $505_2$-$505_{n-1}$ between the input and output layers, and commonly hundreds of such hidden layers. Some of the hidden layers $505_2$-$505_{n-1}$ may have different sizes, organizations, and purposes than other hidden layers $505_2$-$505_{n-1}$. For example, some of the hidden layers in the ML model may be convolution layers, while other hidden layers may be fully connected layers, deconvolution layers, or recurrent layers.

Referring now to FIG. 5B, a neural network training method 550 is depicted, consistent with some embodiments. At operation 552, a training system receives and loads training data. In this example, the input data-set may include system logs from computing systems that previously failed. At operation 554, the training data may be prepared to reduce sources of bias. This may include de-duplication, normalization, and order randomization of the system logs. At operation 556, a neural network model is selected for training and the initial synaptic weights are initialized (e.g., randomized). Depending on the underlying task, suitable models include, but are not limited to, feedforward techniques (e.g., convolutional neural networks), regulatory feedback-based systems, radial basis function (RBF) techniques, and recurrent neural network-based techniques (e.g., long short-term memory). At operation 558, the selected neural network is used to predict an output using the input data element, and that prediction is compared to the corresponding target data. A gradient (e.g., difference between the predicted value and the target value) is then used at operation 560 to update the synaptic weights. This process repeats, with each iteration updating the weights, until the training data is exhausted, or the model reaches an acceptable level of accuracy and/or precision. At operation 562, the resulting model may optionally be compared to previously unevaluated data to validate and test its performance. Operations 552-562 may be repeated periodically and/or using data for a specific VCE to produce a model that adapts to the current software version(s) used in the VCE and/or customized for that workload processed by that particular VCE. In this way, the neural network 500 may begin to predict how that particular VCE behaves under normal/typical workloads.

Figure 6:
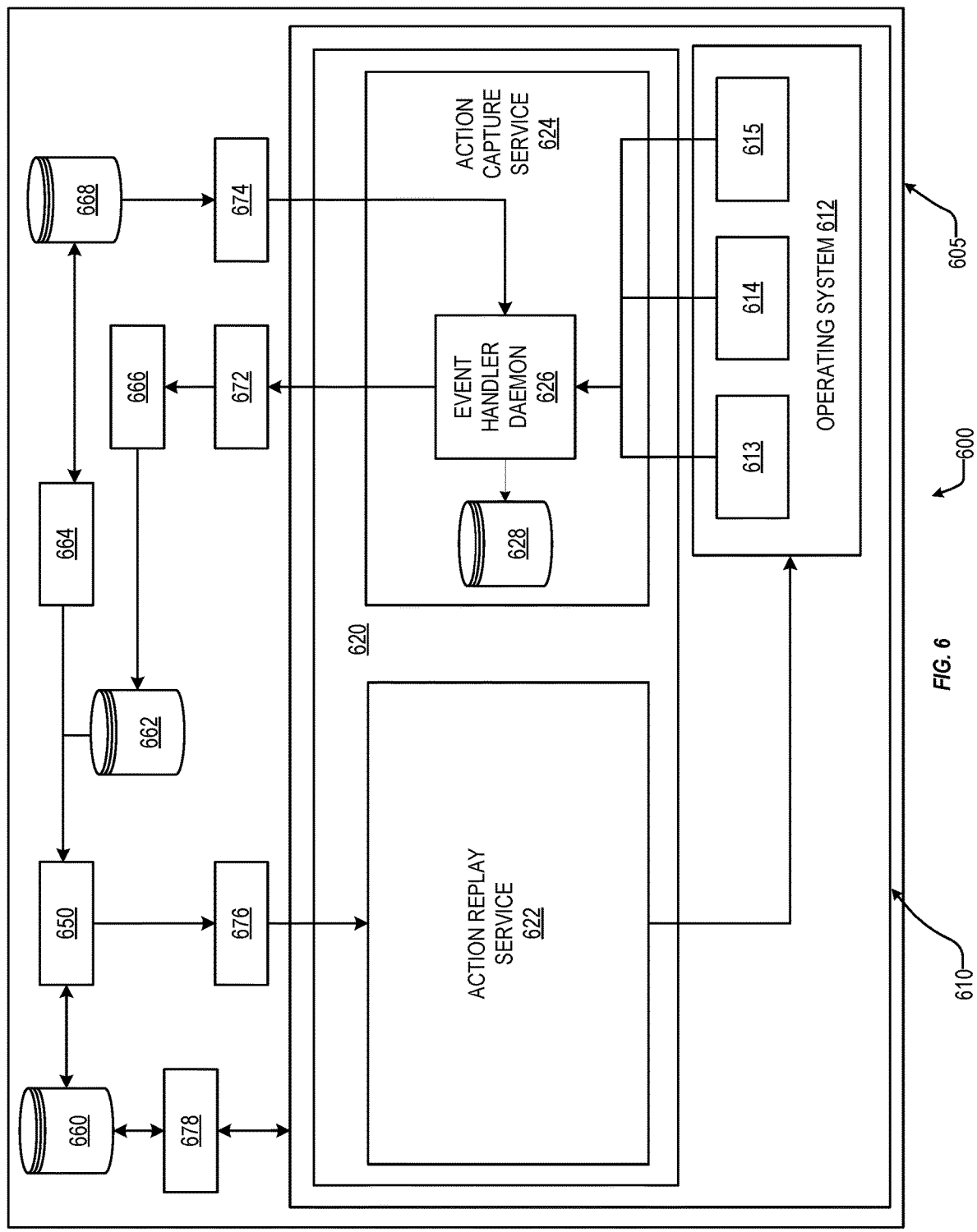
FIG. 6 is a schematic view of a second embodiment of the virtualization environment of FIG. 1, consistent with some embodiments and described with reference to VM-type VCEs.

FIG. 6 is a schematic view of a second embodiment of the virtualization environment 200 of FIG. 1, consistent with some embodiments and described with reference to VM-type VCEs. Advantageously, this second embodiment may enable a method by which a user can automatically correct a VM that has entered an undesirable state, while also preserving desirable changes to the VM that occurred since the last snapshot. This embodiment may additionally provide the user with an opportunity to selectively skip and/or modify events/actions that led to the undesirable state. That is, this embodiment may enable automatic rollback and replay history, as well as enable selective amendments in that history. Advantageously, this may allow the user to create one or more testing flows within the VM.

More specifically, the virtualization environment 200 FIG. 6 may comprise a virtualization platform 605, such as IBM Cloud®, VMWare™, VirtualBox™, or Amazon Web Service™, executing on computer 101 inside computing environment 100 (see FIG. 1). The virtualization environment 200 may manage one or more VCEs (such as VM 610). Each VM 610 may include an OS 612 and guest OS additions 620. The guest OS additions 620, in turn, may comprise an action replay service 622 and an action capture service 624. The action capture service 624 may further include an event handler daemon 626 and a resources-of-interest DB 628.

The OS 612 in this embodiment may include an event handler 613, a plurality of virtualized hardware drivers 614 (one shown for clarity), and one or more hooks 615. The hooks 615 may modify or augment the behavior of the OS 612 by intercepting function calls, messages, or events passed between the various components of the VM 610. In this embodiment, the hooks may generate messages 632 in response to actions in the VM 610 by one or more processes of interest. These recorded actions may be stored in an actions database 662. Suitable examples of hooks 615 include, without limitation, EasyHook, Detours, and LD_PRELOAD.

The action capture service 624 may comprise an event handler daemon 626 that monitors some or all of: the event handler 613, the virtualized hardware drivers 614, and the hooks 615. In some embodiments, the action capture service 624 may detect events-of-interest with respect to an application/process-of-interest 674. In some embodiments, the action capture service 624 may detect events-of-interest with respect to resources-of-interest stored e.g., in the resources-of-interest DB 628. Examples of applications/processes-of-interest 674 include, but are not limited to, RegEdit, InstallShield, and Control Panel. The detected events-of-interest, in turn, may comprise an event chosen from a configurable list of events, such as: an OS configuration change, an OS update, an application configuration change, an application update, an application install, an application configuration change, an application uninstall, a process launch, etc. In some embodiments, the detected events may also comprise various higher-risk activities, such as requesting superuser privileges. Additionally or alternatively, some embodiments may automatically detect events-of-interest using a trained neural network, such as trained neural network 500, that monitors, e.g., the event handler 613, the virtualized hardware drivers 614, and the hooks 615. This trained neural network may be further customized to detect patterns of events that occur inside a particular VM 610. In other embodiments, the action capture service 624 may detect/capture all events that occur inside the VM 610.

The virtualization platform 605 may comprise a replay engine 650, a UI 664, and an action parser 666. The action parser 666 may receive messages from the event handler daemon 626 via a guest additional comms channel upstream manager 672 about a plurality of detected/captured actions, and may store the associated actions in an actions-taken database 626. The replay engine 650 may receive both most recent snapshot 678 from a snapshot database 660 and a list of actions taken since that snapshot from the actions-taken database 626. The replay engine 650 may direct the action replay service 622 to first load the snapshot S into the VM 610, and then may replay (i.e., serially issue) each action in the list to the VM 610. In this way, the replay engine 650 and the action replay service 622 may cooperate to restore the VM 610 to any moment between the snapshot and a current time. The moment may be selected by the user via the UI 664. The UI may additionally allow the user to identify one or more applications/processes-of-interest, which may be stored in applications and/or processes of interest database 668 and registered with the event handler daemon 626 and via a guest additions channel downstream 674.

The event handler daemon 626 in some embodiments, in turn, may compare the detected events to an applications/processes-of-interest database 628. The applications/processes-of-interest may be configured, or otherwise managed, via UI 629. In some embodiments, any events-of-interest detected by the event handler daemon 626 may be timestamped and stored in the changes database 640. In response to a detected event-of-interest, the event handler daemon 626 may also generate a create snapshot message 631 and send the snapshot message 631 the snapshot service 650.

In operation, the action capture service 623 may monitor the one or more "processes of interest" within its associated guest OS addition 620, and may intercept significant actions with respect to those processes of interest, such as committal events, disk write events, hooks, etc. The event handler daemon 626 may record each intercepted action to the actions database 662 as "play it forward" data, ready for later processing. In this way, recording the intercepted actions may allow for later generation of a script (i.e., a list of actions) that will mimic the intercepted events performed by the user in the VM 610. In some embodiments, this may further include ongoing monitoring of any/all files and/or directory locations that were the subject of one of the intercepted committal events, e.g., disk write events, hooks, etc., in case other applications/processes (i.e., not classified as one of the applications/processes-of-interest) within the VM 610 attempt to subsequently make conflicting changes. Any recorded actions that clash with one of those other applications/processes may be highlighted as being riskier contributors to any subsequent undesired state, so a user can be cautious when replaying those operations. Some embodiments may further analyze the recorded actions using a trained neural network, such as neural network 500, to identify risker actions.

At a future point in time, the user may notice that the VM 610 is behaving undesirably. Instead of simply reverting to a prior snapshot 678 in the snapshot database 660, the user in this embodiment may open a UI 664, select the prior snapshot, and then further select one or more actions from a list of recorded actions to be also subsequently replayed. Additionally, the UI 664 may also allow the user to edit (e.g., remove or change) one or more of the recorded actions before they are replayed.

Figure 7A:
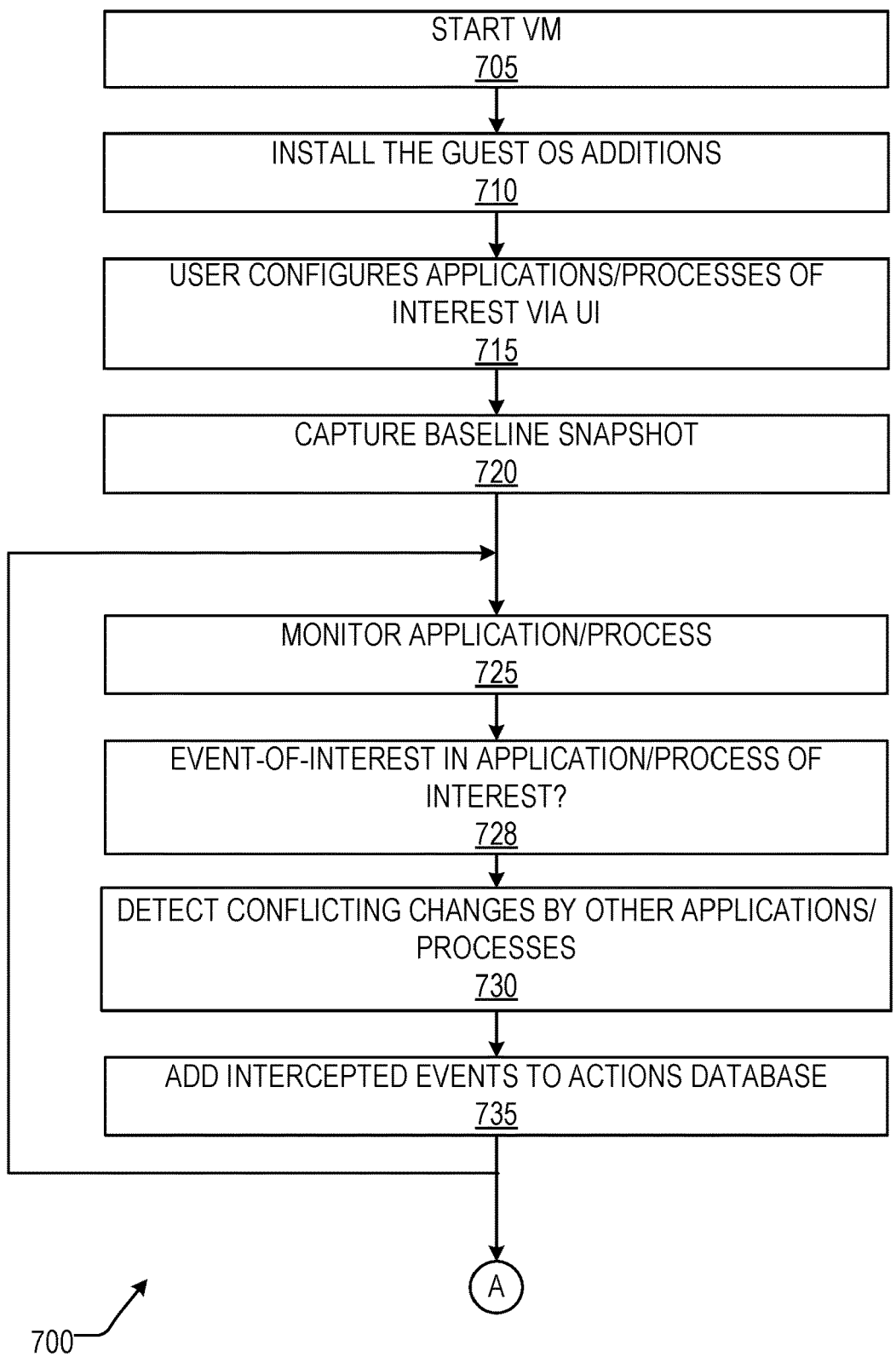
FIGS. 7A-7B are a flow chart illustrating the example snapshot creation service in FIG. 2, in operation.
Figure 7B:
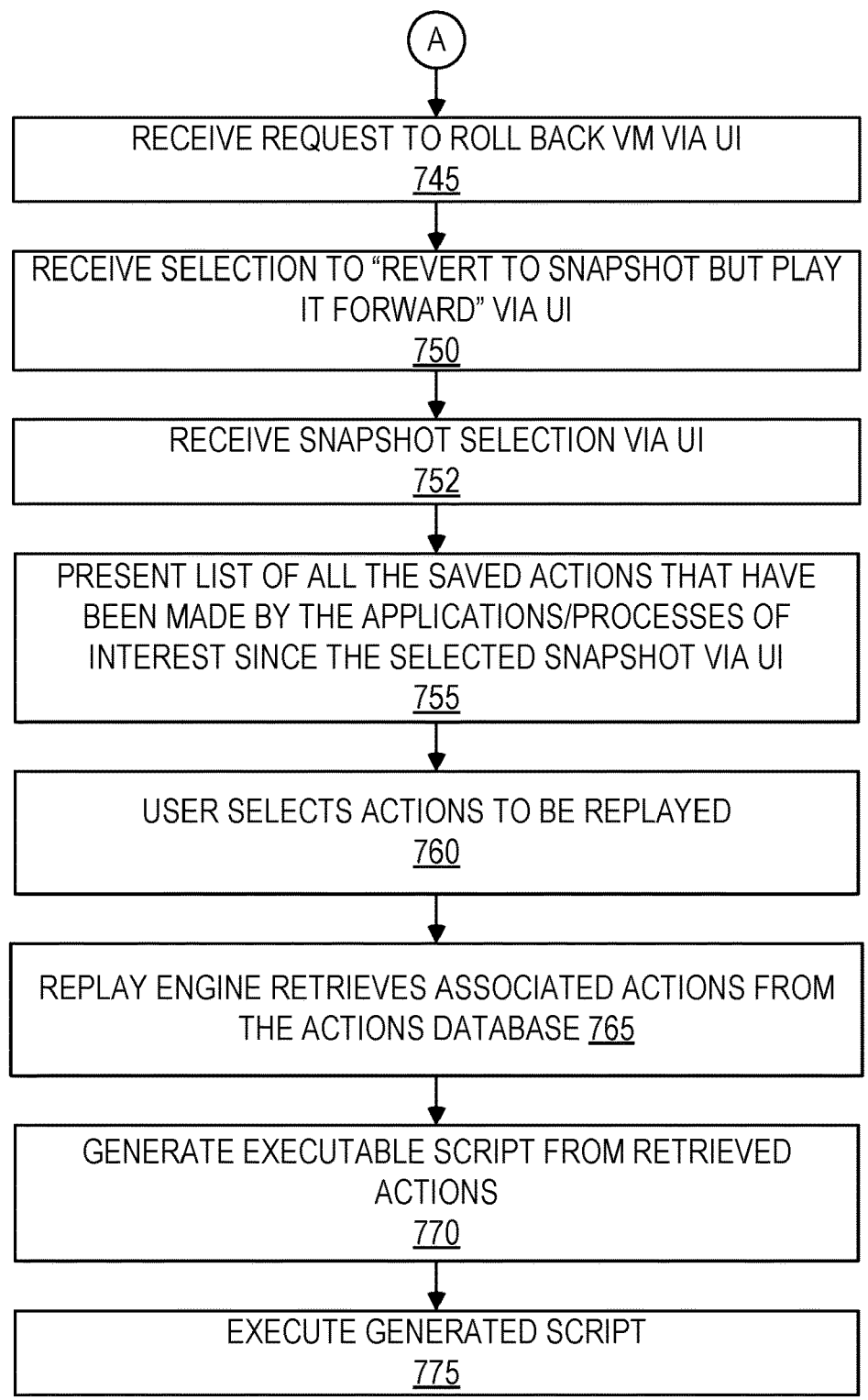

FIGS. 7A-7B are a flow chart 700 illustrating the example action replay service 622 of FIG. 6 in operation. The method illustrated in flow chart 700 begins with a user creating and starting a VM 610 at operation 705. Next, the user may install the guest OS additions 620 to the VM at operation 710. In some embodiments, these guest additions 620 may be automatically provided by a virtualization platform 605 in which the VM 610 is operating.

At operation 715, the user may configure (via the UI 664) a list of "applications of interest" and/or "processes of interest" and/or "resources of interest" for which the user may to auto-collect "play it forward" data. As will be discussed in more detail below, this "play it forward" data may subsequently be used to restore the applications/processes to selectable later state the event that the user needs or wishes to revert the VM (e.g., to restore to a status just before the VM started behaving undesirably). As will be also discussed in more detail below, this "play it forward" data may also be subsequently edited to remove one or more risky operations from the replay. In response to collecting this configuration information, a baseline VM snapshot may be taken at operation 720. This baseline VM snapshot may record the current state of the VM 610.

The user may then begin using the VM 610 normally at operations 725-735. Some of the actions taken by the user during operation 725 may change a state of the VM away from the recorded baseline VM snapshot. For example, the user may change a configuration in one of the applications-of-interest. Also during this period, the guest OS additions 620 may monitor system processes within the VM 610 and may intercept hooks, etc., for each application and/or process of interest at operation 725. In response, the guest OS additions 620 may send the intercepted action 632 up the guest additions data channel 672 to be added to the actions database 662 at operation 735, ready for later processing.

Optionally, the actions guest OS additions 620 may be able to automatically detect (at operation 728) situations where two separate applications and/or processes of interest have made potentially conflicting changes, e.g., two applications both attempting to update the same file in the same directory. In response, the guest additions 620 monitoring of the VM 610 may also begin to intercept action hooks from those other application/processes, i.e., that are not necessarily on the list of applications/processes of interest, but which are also attempting to make conflicting changes with the same files as an applications/processes of interest.

Eventually, after a period of use and monitoring system processes within the VM 610 (i.e., operations 725-735), the user may become aware (at operation 745) that the VM 610 is currently behaving in a negative way and may wish to roll back the state of the VM 610 to a particular saved snapshot. However, the user may also wish to preserve some or all of the change(s) that have been made by their application(s)/process(s) of interest since that snapshot. In response, the user may select an option to "Revert to snapshot but play it forward" at operation 750 via UI 664. The user may then select a snapshot from a list of available snapshots at operation 752. The user may be also presented with a list of all the saved actions that have been made by the applications/processes of interest since the selected snapshot, as well as any identified conflicting changes that have been made by the other applications/processes (at operation 755). The user may then choose which of the saved actions they would like to "play forward" in the UI 664, and the associated recorded actions may be retrieved from the actions database 662 by the replay engine 650 at operations 760-765. Some embodiments can advantageously group related actions together based on a resource an action was taken upon, and highlight them for special attention from the user in the UI 664.

The replay engine 650 may generate one or more scripts from the selected actions to be "played forward" at operation 770. The replay engine may then trigger the action replay service 622 to execute the resulting scripts at operation 775.

In this way, some embodiments may advantageously generate a customizable script replay action relevant to the selected applications/processes-of-interest, saving disk space and processing power as compared to a complete list of actions. Some embodiments may further allow for modification of the recorded actions to be replayed (e.g., a buffer being saved to a file can be read and modified). That is, some embodiments may provide user choice about which changes to play forward and which should not be played forward. This, in turn, may beneficially allow problematic actions to be removed or modified, as well as allow users to quickly and easily generate test scenarios.

Some embodiments may enable interception of events from a configurable list of applications/processes in the guest OS 612 of a VM 610 for the purpose of generating an automated scriptable set of actions 676 that may be executed to replay user actions in a circumstance where a user wishes to revert back to a prior snapshot and then replay forward to a particular state (e.g., shortly before a VM started behaving undesirably). Some embodiments may further enable classification and/or grouping together of a set of changes based upon either and/or both: (i) selected applications/processes-of-interest 668; and (ii) the files being modified by the other applications/processes within the VM 610. These changes may include changes made by other applications within the VM 610 that are not classified as applications/processes of interest 674, but that modify files used by the applications/processes-of-interest.

When playing forward from a reverted snapshot, some embodiments beneficially enable a user make selections in UI 664 about which recorded action(s) should be played forward. For example, some embodiments will enable the user to selectively: (i) play forward ALL the recorded scripted actions, (ii) play forward a sub-selection of the recorded scripted actions (in the same chronological order) that were made by the applications/processes of interest 674, and/or (iii) play forward a sub-selection of the recorded scripted actions (in the same chronological order) that were made by the applications/processes of interest 674 and actions by other applications that influence the same files as those impacted by the applications/processes of interest 674. Moreover, when playing forward from a reverted snapshot, some embodiments may further allow the user to change individual variables/values when playing forward a recorded scripted action.

A non-limiting list of examples are provided hereinafter to demonstrate some aspects of the present disclosure. Example 1 is a method for automatically managing snapshots of applications of interest in virtualized container environment (VCE). The method of Example 1 comprises intercepting an action-of-interest directed to an application-of-interest within a VCE. The method further comprises automatically capturing a snapshot of the VCE before executing the intercepted action-of-interest. The method further comprises executing the intercepted action-of-interest. The method further comprises automatically deleting the snapshot after a predetermined time period following the intercepted action.

Example 2 includes the features of the previous example. In this example, the action-of-interest comprises a configuration change to one or more applications executing in the VCE.

Example 3 includes the features of any of the previous examples. In this example, the action-of-interest comprises a change in an operating system (OS) configuration.

Example 4 includes the features of any of the previous examples. In this example, wherein the predetermined time period is configurable by the user.

Example 5 includes the features of any of the previous examples. In this example, the predetermined time period is configurable with respect to each of a plurality of applications-of-interest.

Example 6 includes the features of any of the previous examples. In this example, the method further comprises defining a warning indicating deletion of the snapshot; and presenting the defined warning to the user.

Example 7 includes the features of any of the previous examples the intercepting of the action-of-interest comprises defining one or more hooks in an operating system of the VCE.

Example 8 includes the features of any of the previous examples. In this example, the intercepting of the action-of-interest comprises defining one or more process handles and events associated with the application-of-interest.

Example 9 includes the features of any of the previous examples. In this example, the intercepting of the action-of-interest comprises monitoring instructions entering virtualized hardware drivers.

Example 10 includes the features of any of the previous examples. In this example, the method further comprises detecting an event-of-interest with respect to the action-of-interest by a trained neural network.

Example 11 includes the features of any of the previous examples. In this example, the method further comprises receiving training data, wherein the training data comprises labeled event data for a plurality of VCEs, wherein at least some of the VCE in the labeled event data have previously crashed; and training the neural network to automatically identify patterns of event timelines that are indicative of a future crash event. The training comprises presenting the labeled event data to the neural network, calculating, by the neural network, a probability score representing a chance that the VCE with crash in response to the event-of-interest, and comparing the calculated probability score to the labeled data.

Example 12 is a method for preserving actions taken after a snapshot. The method of Example 12 comprises capturing a snapshot of a virtualized container environment (VCE), the VCE comprising one or more applications-of-interest. The method further comprises intercepting an event-of-interest directed to an application-of-interest within the VCE. The method further comprises automatically storing the intercepted event in an action database. The method further comprises, in response to a user instruction to revert the VCE to a prior snapshot, generating an automated script from the intercepted events, wherein the automated script comprises actions that occurred in the VCE after capture of the selected snapshot; and executing the automated script.

Example 13 includes the features of any of the previous examples. In this example, the method further comprises identifying events in the VCE that are directed to the one or more applications-of-interest.

Example 14 includes the features of any of the previous examples. In this example, the identifying further includes events taken by other applications that affect the applications-of-interest.

Example 15 includes the features of any of the previous examples. In this example, the events taken by other applications comprise events related to modifying a file used by one or more of the applications-of-interest.

Example 16 includes the features of any of the previous examples. In this example, the method further comprises presenting the stored events to the user by a user interface; receiving, by the user interface, a sub-selection of the stored events to be replayed; and generating the automated script from the sub-selection.

Example 17 includes the features of any of the previous examples. In this example, the method further comprises receiving, by the user interface, one or more modifications to the stored events, modifying the identified stored events, and generating the automated script from the modified stored events.

Example 18 includes the features of any of the previous examples. In this example, the modifications comprise changes to one or more variables associated with at least one of the stored events.

Example 19 includes the features of any of the previous examples. In this example, the event-of-interest comprises results of a user interacting with one or more applications in the VCE.

Example 20 includes the features of any of the previous examples. In this example, the event-of-interest comprises a change in an operating system (OS) configuration.

Example 21 includes the features of any of the previous examples. In this example, intercepting the event-of-interest comprises defining one or more process handles and events associated with the application-of-interest.

Example 22 includes the features of any of the previous examples. In this example, intercepting the event-of-interest comprises monitoring instructions entering virtualized hardware drivers.

Example 23 includes the features of any of the previous examples. In this example, the method further comprises detecting the event-of-interest by a trained neural network.

Example 24 includes the features of any of the previous examples. In this example, the method further comprises receiving training data, wherein the training data comprises labeled event data for a plurality of VCEs, wherein at least some of the VCE in the labeled event data have previously crashed, and training the neural network to automatically identify patterns of event timelines that are indicative of a future crash event. The training comprises presenting the labeled event data to the neural network, calculating, by the neural network, a probability score representing a chance that the VCE with crash in response to the event-of-interest, and comparing the calculated probability score to the labeled data.

Example 25 includes the features of any of the previous examples. In this example, the automated script comprises replays the events-of-interest in a same chronological order as they occurred in the VCE.

Example 26 includes the features of any of the previous examples. In this example, the method further comprises highlighting one or more of the intercepted events in the user interface as higher risk.

Example 27 includes the features of any of the previous examples. In this example, the higher risk events comprise changes by other applications to a file used by one or more of the applications-of-interest.

Example 28 includes the features of any of the previous examples. In this example, the method further comprises intercepting an event-of-interest directed to a file-of-interest within the VCE.

Example 29 is a computer program for implementing the any of the previous examples. Example 30 is a corresponding computer program product.

Example 31 is a system for implementing any of the previous examples.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. For example, some embodiments may identify one or more files/directories of interest, instead or in addition to the applications/processes-of-interest. In these embodiments, the user may select particular directories on the file system of a guest OS, thereby giving it the opportunity to more easily identify where changes are typically known to be the most likely causes of instability/undesirable state of the VM. Common examples of such files/directories may include, without limitation:

C:\Windows\System32\Config\, which is where the Microsoft Windows registry is stored by default;

C:\Program Files, which is often used as the default installation location for newly installed applications; and C:\Users\MyUserId (where "MyUserId" is the name of a particular user), which is where many state files for that particular user are stored by default.

Additionally, the terminology used herein was chosen to explain the principles of the embodiments, the practical application or technical improvement over technologies found in the marketplace, or to enable others of ordinary skill in the art to understand the embodiments disclosed herein. It is therefore contemplated that the appended claims will cover any such modifications or embodiments that fall within the scope of the invention.

What is claimed is:

1. A method for preserving actions taken after a snapshot, comprising:

capturing a snapshot of a virtualized container environment (VCE), the VCE comprising a plurality of applications;

receiving a selection of one or more applications-of-interest from the plurality of applications from a user;

intercepting an event-of-interest directed to an application-of-interest within the VCE, wherein the intercepting occurs in response to the application-of-interest being in the selection of one or more applications-of-interest;

automatically storing the intercepted event-of-interest in an action database; and in response to a user instruction to revert the VCE to a prior snapshot:

presenting intercepted events-of-interest that were stored to the user via a user interface, wherein one or more of the intercepted events-of-interest is a higher risk event that comprises changes by other applications to a file used by the applications-of-interest in the selection of one or more of the applications-of-interest;

receiving, via the user interface, a sub-selection of the intercepted events-of-interest that were stored to be replayed;

receiving, via the user interface, one or more modifications to the sub-selection of the intercepted events-of-interest that were stored;

modifying the sub-selection of intercepted events-of-interest that were stored based on the received one or more modifications, wherein the modifications comprise changes to one or more variables associated with at least one of the sub-selection of intercepted events-of-interest that were stored;

generating an automated script from the modified sub-selection of intercepted events-of-interest, wherein:
      the automated script comprises a modified sub-selection of the sub-selection of intercepted events-of-interest that occurred in the VCE after capture of the selected snapshot; and executing the automated script that replays events-of-interest in a same chronological order as the sub-selection of intercepted events-of-interest occurred in the VCE.

2. The method of claim 1, further comprising receiving a user selection of a set of events-of-interest in the VCE that are directed to the one or more applications-of-interest, wherein the intercepting is further in response to the event-of-interest being in the user selection of the set of events-of-interest.

3. The method of claim 2, wherein the set of events-of-interest further includes events taken by other applications that affect the applications-of-interest.

4. The method of claim 3, wherein the events taken by other applications comprise events related to modifying a file used by one or more of the applications-of-interest.

5. The method of claim 1, wherein the event-of-interest comprises results of a user interacting with one or more applications in the VCE.

6. The method of claim 1, wherein the event-of-interest comprises a change in an operating system (OS) configuration.

7. The method of claim 1, wherein intercepting the event-of-interest comprises defining one or more process handles and events associated with the application-of-interest.

8. The method of claim 1, wherein intercepting the event-of-interest comprises monitoring instructions entering virtualized hardware drivers.

9. The method of claim 1, further comprising detecting the event-of-interest by a trained neural network.

10. The method of claim 9, further comprising:
receiving training data, wherein the training data comprises labeled event data for a plurality of VCEs, wherein at least some of the VCE in the labeled event data have previously crashed; and
training the neural network to automatically identify patterns of event timelines that are indicative of a future crash event, wherein the training comprises:
presenting the labeled event data to the neural network;
calculating, by the neural network, a probability score representing a chance that the VCE with crash in response to the event-of-interest; and
comparing the calculated probability score to the labeled data.

11. The method of claim 1, further comprising highlighting one or more of the intercepted events-of-interest that were stored in a user interface as higher risk.

12. The method of claim 1, further comprising intercepting an event-of-interest directed to a file-of-interest within the VCE.

13. A system for preserving actions taken after a snapshot, the system comprising:
one or more processors; and
a memory communicatively coupled to the one or more processors;
wherein the memory comprises instructions which, when executed by the one or more processors, cause the one or more processors to perform a method comprising:
capturing a snapshot of a virtualized container environment (VCE), the VCE comprising a plurality of applications;
receiving a selection of one or more applications-of-interest from the plurality of applications from a user;
intercepting an event-of-interest directed to an application-of-interest within the VCE, wherein the intercepting occurs in response to the application-of-interest being in the selection of one or more applications-of-interest;
automatically storing the intercepted event-of-interest in an action database; and
in response to a user instruction to revert the VCE to a prior snapshot:
presenting intercepted events-of-interest that were stored to the user via a user interface, wherein one or more of the intercepted events-of-interest is a higher risk event that comprises changes by other applications to a file used by the applications-of-interest in the selection of one or more of the applications-of-interest;
receiving, via the user interface, a sub-selection of the intercepted events-of-interest that were stored to be replayed;
receiving, via the user interface, one or more modifications to the sub-selection of the intercepted events-of-interest that were stored;
modifying the sub-selection of intercepted events-of-interest that were stored based on the received one or more modifications, wherein the modifications comprise changes to one or more variables associated with at least one of the sub-selection of intercepted events-of-interest that were stored;
generating an automated script from the modified sub-selection of intercepted events-of-interest, wherein:
the automated script comprises a modified sub-selection of the sub-selection of intercepted events-of-interest that occurred in the VCE after capture of the selected snapshot; and
executing the automated script that replays events-of-interest in a same chronological order as the sub-selection of intercepted events-of-interest occurred in the VCE.

14. A computer program product for preserving actions taken after a snapshot, the computer program product comprising a computer readable storage medium having program instructions embodied therewith, the program instructions executable by a computer to perform a method comprising:
capturing a snapshot of a virtualized container environment (VCE), the VCE comprising a plurality of applications;
receiving a selection of one or more applications-of-interest from the plurality of applications from a user;
intercepting an event-of-interest directed to an application-of-interest within the VCE, wherein the intercepting occurs in response to the application-of-interest being in the selection of one or more applications-of-interest;
automatically storing the intercepted event-of-interest in an action database; and
in response to a user instruction to revert the VCE to a prior snapshot:
presenting intercepted events-of-interest that were stored to the user via a user interface, wherein one or more of the intercepted events-of-interest is a higher risk event that comprises changes by other applications to a file used by the applications-of-interest in the selection of one or more of the applications-of-interest;
receiving, via the user interface, a sub-selection of the intercepted events-of-interest that were stored to be replayed;
receiving, via the user interface, one or more modifications to the sub-selection of the intercepted events-of-interest that were stored;
modifying the sub-selection of intercepted events-of-interest that were stored based on the received one or more modifications, wherein the modifications comprise changes to one or more variables associated with at least one of the sub-selection of intercepted events-of-interest that were stored;
generating an automated script from the modified sub-selection of intercepted events-of-interest, wherein:
the automated script comprises a modified sub-selection of actions the sub-selection of intercepted events-of-interest that occurred in the VCE after capture of the selected snapshot; and
executing the automated script that replays events-of-interest in a same chronological order as the sub-selection of intercepted events-of-interest occurred in the VCE.

* * * * *